UNITED STATES PATENT OFFICE.

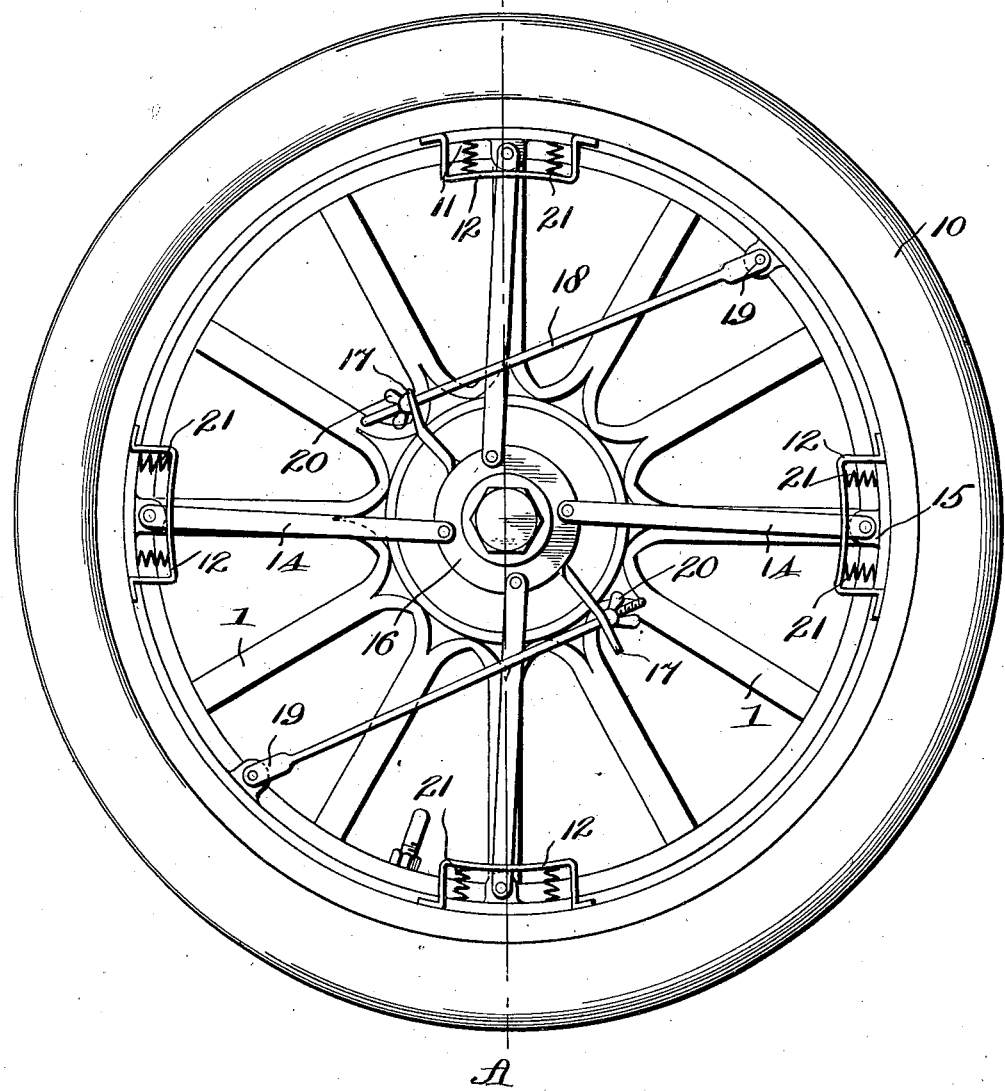

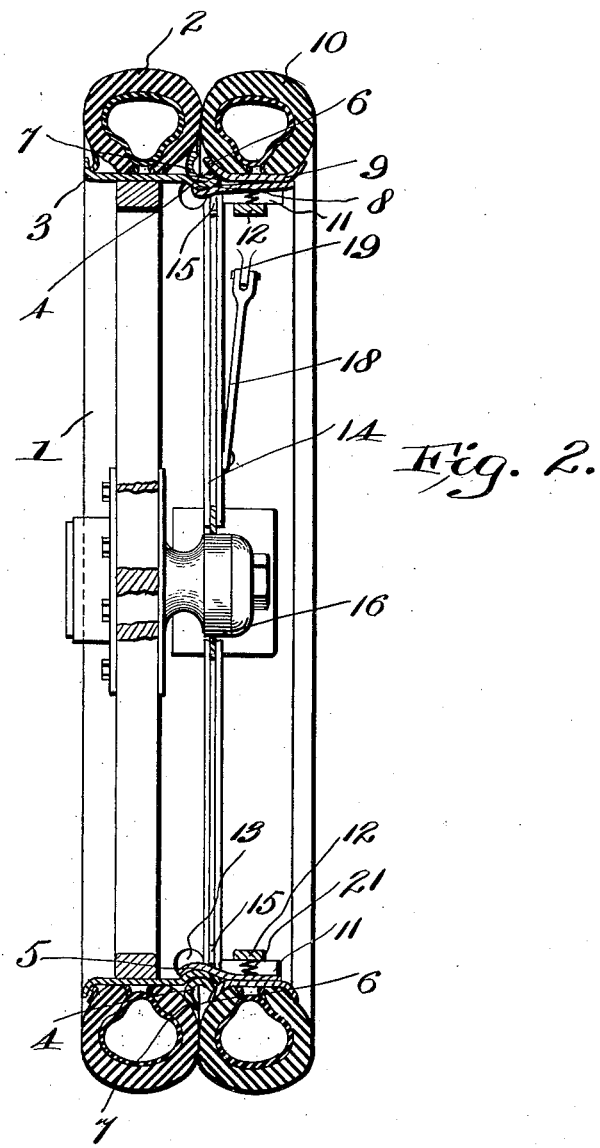

CHARLES ERNEST LEGGE, OF JOHANNESBURG, TRANSVAAL, SOUTH AFRICA.

AUXILIARY-TIRE ATTACHMENT.

1,101,457. Specification of Letters Patent. Patented June 23, 1914.

Application filed February 18, 1913. Serial No. 749,185.

*To all whom it may concern:*

Be it known that I, CHARLES ERNEST LEGGE, a British subject, residing at 112 Marshall street, Johannesburg, Transvaal, Union of South Africa, have invented certain new and useful Improvements in Auxiliary-Tire Attachments; and I do hereby declare the following to be a full, clear, and exact description of the invention, such as will enable others skilled in the art to which it appertains to make and use the same.

The present invention relates to means for attaching auxiliary tires to the wheels of automobiles and the like.

It frequently happens that should the tire of the road wheel be damaged, it is more desirable to attach an auxiliary tire to the wheel than repair the damaged one. Sometimes, for instance when traveling over marshy or sandy ground, it is also an advantage to fit auxiliary tires to the wheels to widen the tread of the latter. This invention provides means by which such auxiliary tires may be attached as desired.

According to this invention, the road wheel to which the auxiliary tire is to be attached must be provided with means such as a projection or annular inwardly projecting beading at the edge of the rim on the side away from the automobile. Such projecting means may take the form of a beading formed integral with the rim, a ring secured thereto, or a number of separate pieces secured around the edge to project toward the center of the rim. A number of automobile wheels, as now constructed, are provided with a rim having a groove at its edge into which is sprung a split ring for locking the tire in place. The groove is formed by pressing the metal in toward the center of the wheel and thus raising an annular beading such as is required for the attachment of the auxiliary tire, according to this invention.

The preferred form of the invention fitted to an automobile wheel such as the one above referred to, is shown in the accompanying drawings, in which:

Figure I is a side elevation of the wheel and auxiliary tire secured in place; and Fig. II is a section on the line A—A, Fig. I.

1 is the automobile wheel fitted with the tire 2 and rim 3 provided with the groove 4 forming the internally projecting annular beading 5. Into groove 4 is sprung the ring 6, for locking the tire in place. By springing out ring 6 the ring 7 may be slid over the edge 8 of rim 3 and tire 2 can then be removed easily.

9 is the rim carrying the auxiliary tire 10. Rim 9 is provided with a plurality of clips in the form of plates 11 loosely held thereto by brackets 12. Plates 11 project sufficiently far beyond the edge of rim 9 to take onto the projection or beading 5. The edge 13 of plate 11 is shaped to bed onto the projection or beading 5. Plates 11 are sufficiently loose in brackets 12 to enable them to be passed over the beading 5 and into position. They are then clamped, by any appropriate means, to hold their edges 13 firmly in engagement with projections or beading 5, and the rim 9 concentric with rim 3. In the drawing, such clamping means consists of links 14 engaging lugs 15 and connecting the plates with ring 16 adapted to pass over the end of the hub of wheel 1. Links 14 are so connected to ring 16 that when plates 11 are in gripping engagement with the projections or beading 5 they will extend substantially radially from the center of the ring and tend to form a toggle therewith. To release the grip of plates 11 the ring is revolved about its center and moves links 14 to take up a position somewhat tangential to ring 16 and so draw plates 11 toward the center of the rim.

Ring 16 is provided with radial extensions 17 which are engaged by rods 18 hinged at one end 19 to rim 9 and at the other threaded and furnished with winged nuts 20 or otherwise provided with means for engagement with extensions 17 to rotate the ring 16 and hold the same in place. Springs 21 may be provided to press plates 11 outwardly.

It will be understood that by means of this invention an auxiliary tire may be very quickly fitted to a road wheel.

The operation is as follows: Rim 9 carrying tire 10 is placed concentrically with and in proximity to wheel 1. Ring 16 is rotated to draw plates 11 inwardly against the pressure of springs 21 and the ends 13 of plates 11 placed in position over the projections or beading 5. Ring 16 is then rotated in the opposite direction which forces the plates into engagement with the wheel rim and nuts 20 are tightened up to hold the same securely in position.

What I claim, and desire to secure by Letters Patent is:—

1. An auxiliary tire for wheels comprising a rim, brackets thereon, clips carried in said brackets, springs tending to force the clips outwardly from the center of the rim, links associated with said clips, a connecting piece at the center of the rim to which said links are attached, threaded rods secured at one end to the rim and at the other associated with said connecting piece and nuts thereon by means of which the connecting piece is rotated to move said clips into a position away from the center of the rim.

2. Means for attaching auxiliary tires to wheels comprising in combination, a road wheel, a rim thereon, an inwardly projecting part at the edge of the rim, an auxiliary rim, clips thereon, a ring at the center of the auxiliary rim adapted to encircle the hub of the wheel, links connecting the clips to the ring, projections extending radially from the ring, threaded rods connected to the auxiliary rim and engaging such projections to rotate the ring and force the clips into engagement with the inwardly projecting part of the wheel rim.

In testimony whereof, I affix my signature, in presence of two witnesses.

CHARLES ERNEST LEGGE.

Witnesses:
 WESLEY E. JOHN,
 J. W. VENNING.